United States Patent
McIntosh

(10) Patent No.: US 9,878,792 B2
(45) Date of Patent: Jan. 30, 2018

(54) STOWAGE CAROUSEL AND METHOD OF STORING CARGO FOR USE WITH AN AIRCRAFT

(71) Applicant: THE BOEING COMPANY, Chicago, IL (US)

(72) Inventor: Darren C. McIntosh, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 238 days.

(21) Appl. No.: 14/790,515

(22) Filed: Jul. 2, 2015

(65) Prior Publication Data
US 2017/0001725 A1    Jan. 5, 2017

(51) Int. Cl.
| | | |
|---|---|---|
| *B64C 1/22* | (2006.01) | |
| *B64D 9/00* | (2006.01) | |
| *B64D 11/00* | (2006.01) | |

(52) U.S. Cl.
CPC .............. *B64D 11/003* (2013.01); *B64C 1/22* (2013.01); *B64D 9/00* (2013.01); *B64D 11/0007* (2013.01)

(58) Field of Classification Search
CPC .... B64D 11/003; B64D 11/0007; B64D 9/00; B64C 1/22
See application file for complete search history.

(56) References Cited

U.S. PATENT DOCUMENTS

| | | | | |
|---|---|---|---|---|
| 4,318,328 | A | * 3/1982 | Rona ........................ | B64D 7/08 244/137.4 |
| 6,454,208 | B1 | 9/2002 | Nervig et al. | |
| 7,744,033 | B2 | * 6/2010 | Gonzalez Linero . | B64D 11/003 244/118.5 |
| 8,286,914 | B2 | * 10/2012 | Breuer ..................... | B64D 9/00 244/118.5 |
| 9,073,638 | B2 | * 7/2015 | Huber ...................... | B64D 9/00 |
| 2010/0230536 | A1 | 9/2010 | Breuer et al. | |
| 2013/0168500 | A1 | * 7/2013 | Huber ...................... | B64D 9/00 244/137.1 |

FOREIGN PATENT DOCUMENTS

EP        2602187 A1    6/2013

OTHER PUBLICATIONS

Extended European Search Report for co-pending EP Application No. 16177362.2, dated Nov. 7, 2016 (7 pages).

* cited by examiner

*Primary Examiner* — Richard R Green
(74) *Attorney, Agent, or Firm* — Jay J. Hoette; The Small Patent Law Group, LLC

(57) ABSTRACT

A stowage carousel for handling cargo aboard an aircraft is provided including a revolving conveyor having an inner ring facing a passenger cabin of the aircraft and an outer ring facing a fuselage of the aircraft. Stowage compartments are associated with the revolving conveyor. The stowage compartments are configured to receive the cargo. The stowage compartments are rotatable within the aircraft with the revolving conveyor. The revolving conveyor is situated within the aircraft partially in the passenger cabin and partially in at least one of an upper crown and a lower lobe of the aircraft.

32 Claims, 8 Drawing Sheets

STOWAGE CAROUSEL AND METHOD OF STORING CARGO FOR USE WITH AN AIRCRAFT

BACKGROUND

The present disclosure relates generally to systems and methods of stowage of cargo on an aircraft using a stowage carousel.

Stowage of cargo on aircraft is problematic. The aircraft has space dedicated to different functions and optimizing the space is important. For example, space is dedicated to passengers in the passenger cabin in the form of passenger seats. Each seat on the aircraft adds to the ability for the airline to generate revenue for each flight. Therefore, it is desirable to maximize the number of passenger seats on an aircraft, taking into consideration passenger safety, comfort and the like. However, some space on the aircraft must be dedicated to other functions such as stowage of cargo, galley operation, lavatories, and the like.

Presently, more and more passengers are carrying hand luggage into the passenger cabin in lieu of checking the luggage and having the luggage stowed in the lower lobe of the aircraft. The increase in the amount of carry-on luggage has put increased pressure on overhead stow bin capacities and volumes. Some closets are provided in the passenger cabin for additional stowage, however, such closets occupy valuable floor space on the aircraft, taking space that could otherwise be used for revenue generating passenger seats.

Additionally, many aircraft have multiple, large galleys to store food and beverages on the aircraft. The food and beverages are typically stored in galley carts and galley containers which are transported to the aircraft and stored in compartments in the galleys. The large number of galley containers used on the aircraft occupy a significant amount of space, and have led to larger galley footprints on the aircraft. Reduction in galley footprints would allow additional space to be utilized for revenue generating passenger seats.

SUMMARY

In accordance with one embodiment, a stowage carousel for handling cargo aboard an aircraft is provided including a revolving conveyor having an inner ring facing a passenger cabin of the aircraft and an outer ring facing a fuselage of the aircraft. Stowage compartments are associated with the revolving conveyor. The stowage compartments are configured to receive the cargo. The stowage compartments are rotatable within the aircraft with the revolving conveyor. The revolving conveyor is situated within the aircraft partially in the passenger cabin and partially in at least one of an upper crown and a lower lobe of the aircraft.

In another embodiment, a method of stowing cargo aboard an aircraft is provided including moving the cargo into a passenger cabin of the aircraft, placing the cargo into a revolving stowage carousel via an opening and rotating the revolving stowage carousel to stow the cargo.

The features and functions that have been discussed can be achieved independently in various embodiments or may be combined in yet other embodiments, further details of which can be seen with reference to the following description and drawings.

DETAILED DESCRIPTION

Figure 1:
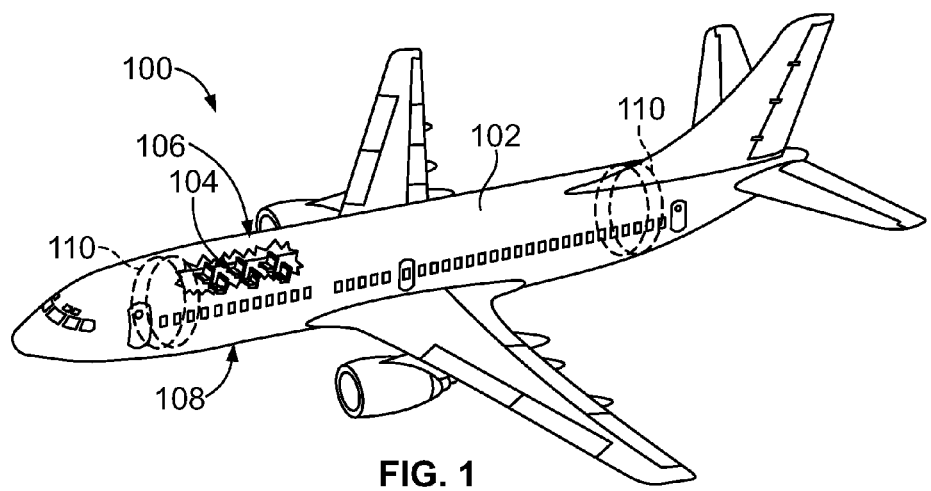
FIG. 1 illustrates an aircraft having one or more stowage carousels formed in accordance with an exemplary embodiment.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Described herein are various embodiments of a stowage carousel for an aircraft configured to stow cargo such as carry-on luggage, standard galley containers for galleys, and the like. Various embodiments provide a revolving, annular carousel that rotates along an arc path that accepts the cargo and stores the cargo near the perimeter of the fuselage. The carousel may be a continuous loop in various embodiments. The carousel may be a partial loop in other various embodiments. The carousel may be used to store the cargo in the upper crown of the aircraft and/or in the lower lobe of the aircraft as well as along side walls of the fuselage. The stowage carousel utilizes the vertical height of the aircraft, while providing usable access to the valuable floor space by stowing the cargo above and/or below the passenger cabin. The valuable floor space may thus be dedicated to other purposes, such as passenger seats, to potentially increase the yearly revenue stream of the aircraft. In various embodiments, the stowage carousel may store cargo previously stored in a galley, thus reducing the size of the galley on the aircraft for other uses, such as to provide a space for a lavatory or for additional passenger seats.

FIG. 1 illustrates an aircraft 100 having one or more stowage carousels 110 formed in accordance with an exemplary embodiment. The stowage carousels 110 are used to handle cargo aboard the aircraft 100. For example, stowage carousels 110 may handle passenger luggage, such as carry-on luggage and/or storage containers such as standard galley containers. The stowage carousel 110 is an annular revolving carousel that accepts the cargo and stows it near the perimeter of the circular fuselage cross-section.

The aircraft 100 includes a fuselage 102 defining a passenger cabin 104. The aircraft 100 includes an upper crown 106 above the passenger cabin 104 and a lower lobe 108 below the passenger cabin 104. For example, the upper crown 106 may be defined between a ceiling of the passenger cabin 104 and the fuselage 102, while the lower lobe 108 may be defined below a floor of the passenger cabin 104 and the fuselage 102. The stowage carousel 110 may be accessible within the passenger cabin 104. For example, the cargo may be loaded into the stowage carousels 110 from within the passenger cabin 104. In other various embodiments, the cargo may be loaded into the stowage carousels 110 from other areas of the aircraft 100, such as from the lower lobe 108.

The stowage carousel 110 is a mechanized carousel for the cargo where the stowage carousel 110 hugs, such as in close proximity to, the inner mold line of the fuselage 102. The stowage carousel extends along an arc path around the fuselage 102. The stowage carousel 110, as in the illustrated embodiment, may extend along an arc path that may be a continuous loop (e.g., 360° around the fuselage 102). Alternatively, the stowage carousel 110 may extend along a partial arc path, such as from the passenger cabin 104 into the upper crown 106 (as in the embodiment of the stowage carousel 210 shown in FIG. 18) or from the passenger cabin 104 into the lower lobe 108. In an exemplary embodiment, the stowage carousel 110 includes a plurality of individual stowage compartments receiving different cargo items therein. The stowage compartments may be rotatable with the stowage carousel 110.

Figure 2:
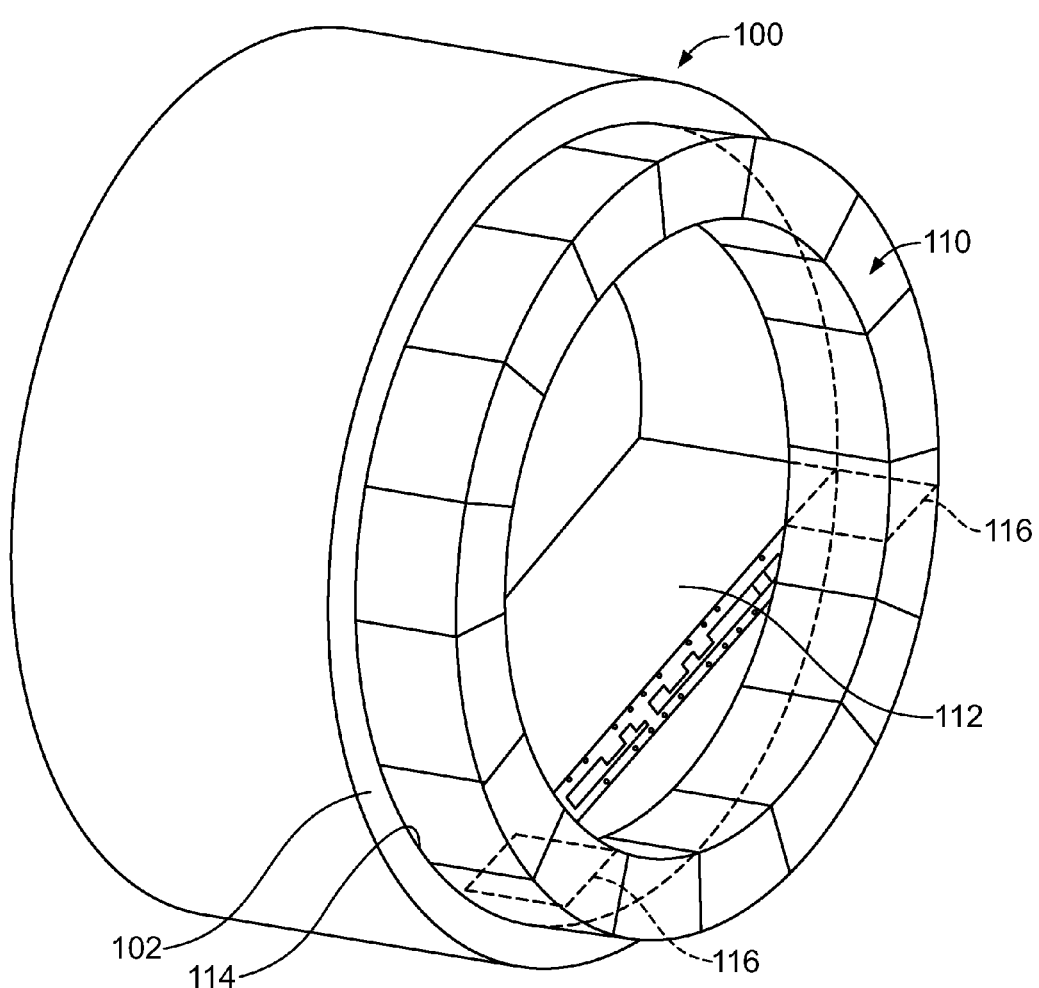
FIG. 2 is a perspective view of the stowage carousel in accordance with an exemplary embodiment.

FIG. 2 is a perspective view of the stowage carousel 110 in accordance with an exemplary embodiment. FIG. 2 illustrates the stowage carousel 110 positioned relative to the fuselage 102, and shows the orientation of the stowage carousel 110 relative to a cabin floor 112 of the aircraft 100. The stowage carousel 110 is configured to be positioned in close proximity to an interior surface 114 of the fuselage 102. The stowage carousel 110 is at least partially rotatable relative to the fuselage 102.

In an exemplary embodiment, the stowage carousel 110 passes through the cabin floor 112 such that the stowage carousel 110 is positioned both above the cabin floor 112 and below the cabin floor 112. The cargo stowed in the stowage carousel 110 may be stowed at any of multiple positions. For example, at least a portion of the stowage carousel 110 may be clocked to many different predetermined positions to move the cargo. The cargo is rotated with the stowage carousel 110 as the portion(s) of the stowage carousel 110 are rotated to the various positions. As such, a large number of cargo items may be stowed in the stowage carousel 110, while the stowage carousel 110 has a relatively small footprint on the cabin floor 112. For example, the stowage carousel 110 has first and second footprints 116 on the cabin floor 112 at opposite first and second sides of the fuselage 102.

Figure 3:
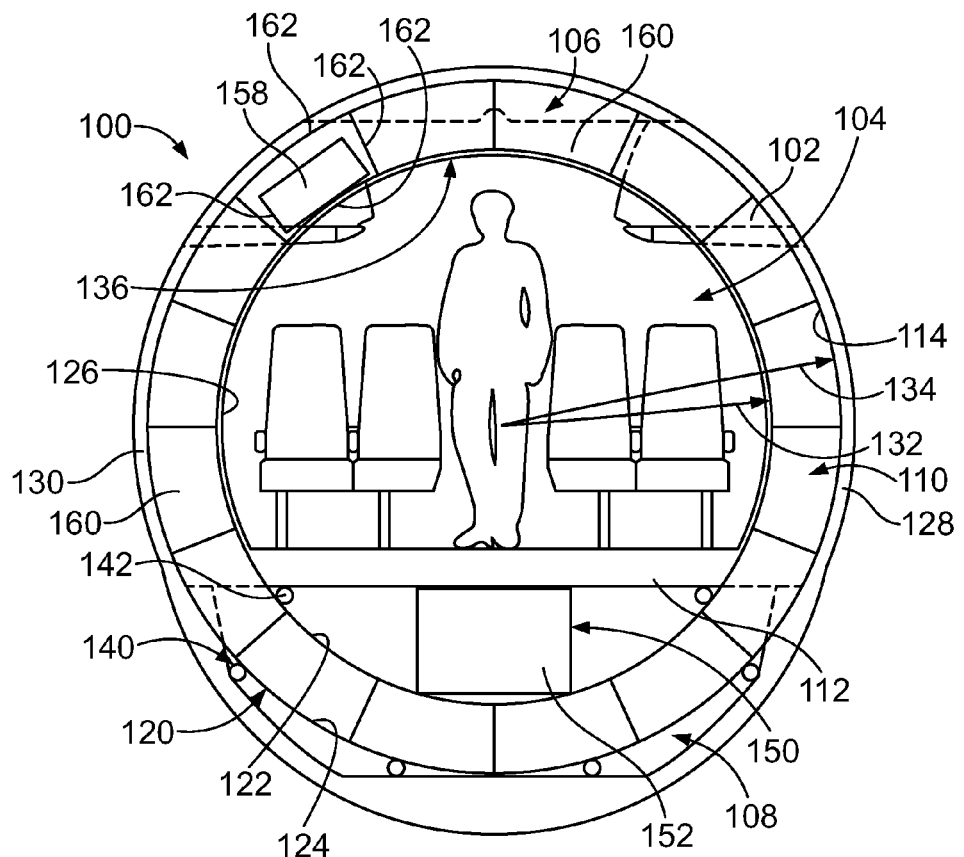
FIG. 3 is a cross-sectional view of the aircraft showing the stowage carousel positioned within a fuselage of the aircraft.

FIG. 3 is a cross-sectional view of the aircraft 100 showing the stowage carousel 110 positioned within the fuselage 102. The stowage carousel 110 is mounted to the interior of the interior surface 114 of the fuselage 102. In the illustrated embodiment, the stowage carousel 110 is provided in the passenger cabin 104, as well as the upper crown 106 and the lower lobe 108. The stowage carousel 110 extends through the cabin floor 112 into the lower lobe 108. The cargo may be accessible from the passenger cabin 104, from the lower lobe 108 and/or from the upper crown 106, such as for loading and unloading.

The stowage carousel 110 includes a wheel or revolving conveyer 120 that is rotatably mounted within the fuselage 102. The revolving conveyer 120 is vertically oriented (e.g., in a vertical plane) and defines a walkway 136 through the interior of the revolving conveyer 120 within the passenger cabin 104. The walkway 136 may be the form of an archway above the cabin floor 112. The walkway 136 is of sufficient height that a person is able to walk therethrough. For example, the walkway 136 may have a height from the cabin floor 112 of at least a $95^{th}$ percentile height man. The walkway 136 may have a height from the cabin floor 112 at least as high as the passenger entryway into the aircraft 100. The revolving conveyer 120 includes an inner ring 122 facing the passenger cabin 104 and an outer ring 124 facing the fuselage 102 of the aircraft 100. The revolving conveyer 120 is open inside the inner ring 122 and dimensioned for passengers to walk through the revolving conveyer 120. In an exemplary embodiment, the inner and outer rings 122, 124 rotate. Alternatively, the inner and outer rings may be stationary and other components of the revolving conveyor 120 may rotate along the inner and outer rings 122, 124.

In an exemplary embodiment, a wall or lining 126 is provided interior of the inner ring 122 to cover the revolving conveyer 120 along the archway. The revolving conveyer 120 rotates relative to the lining 126. The lining 126 faces the passenger cabin 104 and is exposed within the passenger cabin 104. Optionally, the lining 126 may include one or more closable openings that provide access to the revolving conveyer 120 for loading the cargo therein. The closable openings may be closed by corresponding doors. The lining 126 may extend from the cabin floor 112 at or near a first sidewall 128 of the fuselage 102 upward along the stowage carousel 110. The lining 126 may extend across the top or ceiling of the passenger cabin 104. The lining 126 may extend back downward along the stowage carousel 110 to the cabin floor 112 at or near a second sidewall 130 of the fuselage 102. The inner ring 122 has an inner radius 132 approximately equal to a lining radius dimension of the lining 126. The outer ring 124 has an outer radius 134 approximately equal to a sidewall radius dimension of the fuselage 102.

The stowage carousel 110 includes a track 140 for controlling revolving motion of the revolving conveyer 120. For example, the track 140 may include a plurality of rollers 142 for restricting translating movement of the revolving conveyer 120, while allowing rotating movement of the revolving conveyer 120. Other types of tracks may be provided in alternatively embodiments for controlling movement of the revolving conveyer 120, such as a rail. The track 140 may allow the revolving conveyor 120 to rotate from the passenger cabin 104 to the upper crown 106. The track 140 may allow the revolving conveyor 120 to rotate from the passenger cabin 104 to the lower lobe 108.

The stowage carousel 110 includes a control system 150 for controlling movement of the revolving conveyer 120. In an exemplary embodiment, the control system 150 includes an actuator 152 for controlling the rotated position of the revolving conveyer 120. In an exemplary embodiment, the actuator 152 allows clockwise and counterclockwise movement of the revolving conveyer 120. Optionally, the revolving conveyer 120 may have a predetermined number of preset angular positions and the revolving conveyer 120 is moved to such preset positions.

The actuator 152 may include an electric motor operably coupled to the revolving conveyer 120. For example, the actuator 152 may be coupled to the revolving conveyer 120 by a belt, chain, gear and the like for rotating the revolving conveyer 120. In the illustrated embodiment, the actuator 152 is provided below the cabin floor 112 in the lower lobe 108. The actuator 152 is positioned to the interior of the inner ring 122. Optionally, the actuator 152 may be accessed through a floor panel in the cabin floor 112, for example to access a hand crank to control the position of the revolving conveyer 120, such as if the electric motor fails. Optionally, the control system 150 may include a scanner 154 (FIG. 12), a user interface 156 (FIG. 12), or other components within the passenger cabin 104 for controlling the control system 150.

In an exemplary embodiment, the stowage carousel 110 includes a plurality of stowage compartments 160. In the illustrated embodiment, the stowage carousel 110 includes sixteen stowage compartments 160; however any number of stowage compartments 160 may be provided depending on factors such as the size of the revolving conveyor 120 and the size of the stowage compartments 160. Each stowage compartment 160 is configured to receive one or more items of cargo 158. For example, the stowage compartments 160 may receive carry-on luggage, standard galley containers, or other items. Optionally, the stowage compartments 160 are defined by one or more compartment walls 162. For example, each stowage compartment 160 may include compartment walls 162 defining a front (e.g., forward), a rear (e.g., aft), sides, and ends (e.g., bottom and top). The front and/or rear may be open to receive the cargo. The stowage compartments 160 may include closable doors to close the opening at the front and/or the rear. The sides may extend along the inner ring 122 and outer ring 124. Optionally, the sides may define the inner and outer rings 122, 124.

The stowage compartments 160 are rotated with the revolving conveyer 120 such that, at one position, the compartment wall 162 defining an end may define a bottom of the stowage compartment 160; however, at another position, such same compartment wall 162 may define a top of the stowage compartment 160. Alternatively, in other various embodiments, the stowage compartments 160 may have a gyroscope arrangement where the stowage compartments 160 are rotatable relative to the revolving conveyer 120 such that the bottom wall of the stowage compartment 160 always remains at a bottom of the stowage compartment 160 as the revolving conveyer 120 and the stowage compartment 160 are rotated about the fuselage 102. For example, the stowage compartments 160 may be hingedly coupled to the inner ring 122, the outer ring 124 and/or a mounting bracket extending between the inner and outer rings 122, 124.

In an exemplary embodiment, the stowage compartments 160 are arcuate shaped and define annular segments. For example, the stowage compartments 160 may be approximately trapezoidal shaped having arcuate sides. Other shapes are possible in alternative embodiments. Optionally, the stowage compartments 160 may share compartment walls 162, such as the end walls. Optionally, the stowage compartments 160 may be sized, shaped and dimensioned to receive aircraft standard sized carry-on luggage (e.g., approximately 45 cm×25 cm×56 cm). The stowage compartments 160 may be sized, shaped and dimensioned to receive aircraft standard galley containers (e.g., approximately 30 cm×42 cm×28 cm). The stowage compartments 160 may have other sizes in alternative embodiments.

Optionally, the revolving conveyor 120 may include different sized stowage compartments 160 for stowing appropriate cargo. In other alternative embodiments, rather than pre-sized stowage compartments 160 with walls, the cargo may be attached directly to the revolving conveyer 220, such as using a hook, strap, rail or other attachment component and rotated upward or downward by the revolving conveyor 220.

Figure 4:
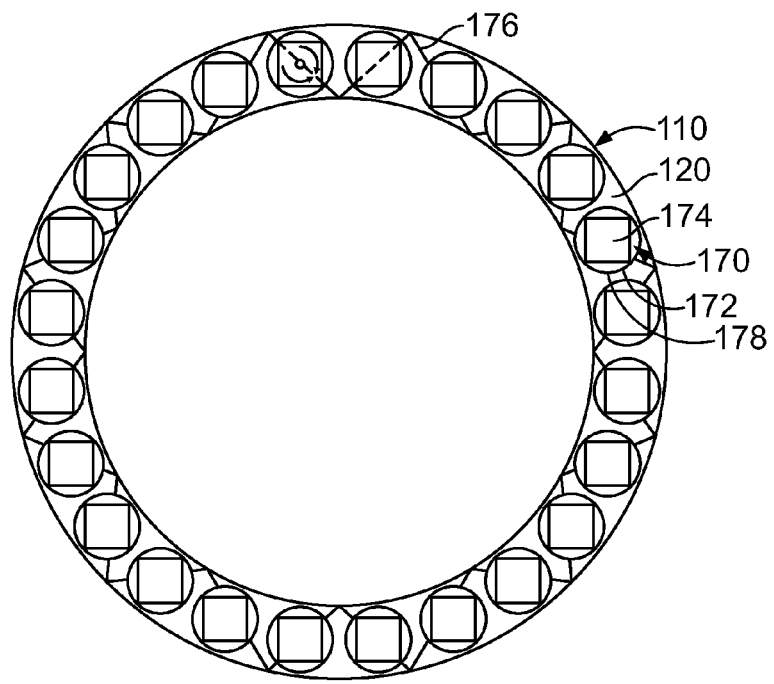
FIG. 4 illustrates a revolving conveyer of the stowage carousel having a plurality of stowage compartments formed in accordance with an exemplary embodiment.

FIG. 4 illustrates the revolving conveyer 120 having a plurality of stowage compartments 170 formed in accordance with an exemplary embodiment. The stowage compartments 170 are sized and shaped differently than the stowage compartments 160 (shown in FIG. 3). In the illustrated embodiment, twenty-four stowage compartments 170 are provided; however any number of stowage compartments 170 may be provided in alternative embodiments. The stowage compartments 170 are smaller than the stowage compartments 160 and thus a greater number of stowage compartments 170 are provided in the revolving conveyer 120 between the inner and outer rings 122, 124. The stowage compartments 170 are sized, shaped and dimensioned to receive standard galley containers 174. The stowage compartments 170 may be accessed at the front or the rear for loading the galley containers 174 therein.

The stowage compartments 170 have compartment walls 172. In the illustrated embodiment, the compartment walls 172 are generally circular; however, the compartment walls 172 may have other shapes in alternative embodiments, such as a rectangular shape, an annular segment shape, or another shape. In an exemplary embodiment, the stowage compartments 170 are mounted to mounting brackets 176 between the inner and outer rings 122, 124. Optionally, the mounting brackets 176 may extend across either the front or the rear opposite the openings to the stowage compartments 170. In an exemplary embodiment, the stowage compartments 170 are hingedly coupled to the mounting brackets 176. The stowage compartments 170 are free to rotate relative to the inner and outer rings 122, 124. As such, the stowage compartments 170 may maintain the gravitational orientation (e.g., gyroscope arrangement) of such stowage compartments 170. As such, bottoms 178 of the stowage compartments 170 may always remain approximately downward facing.

Figure 5:
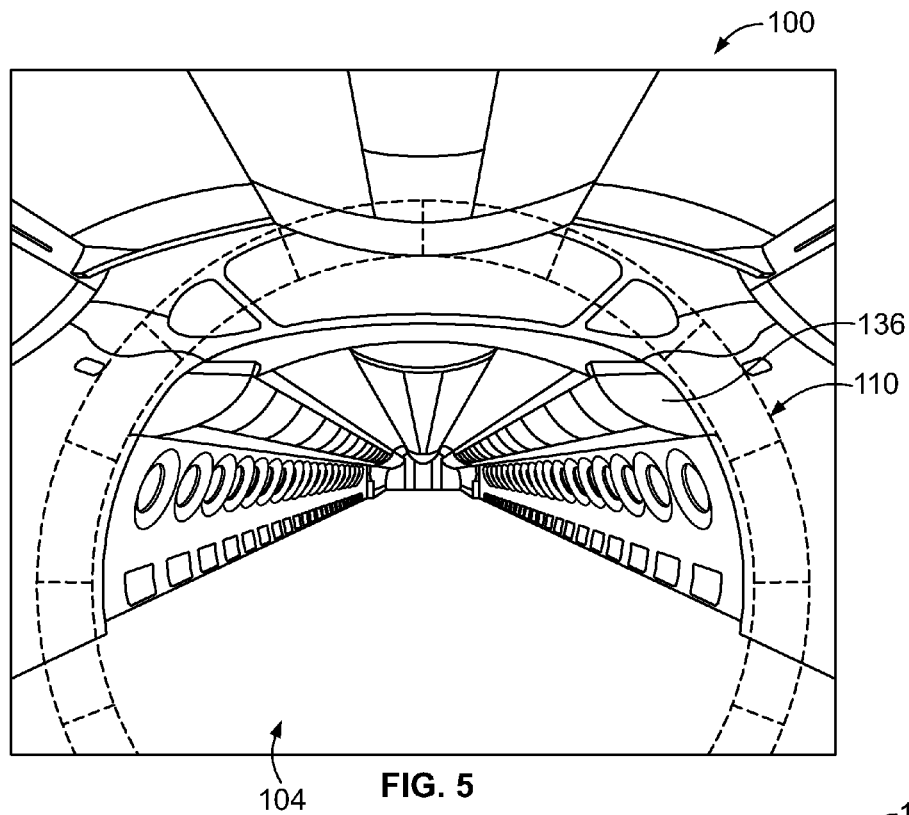
FIGS. 5 and 6 illustrate exemplary locations for the stowage carousel within the aircraft.
Figure 6:
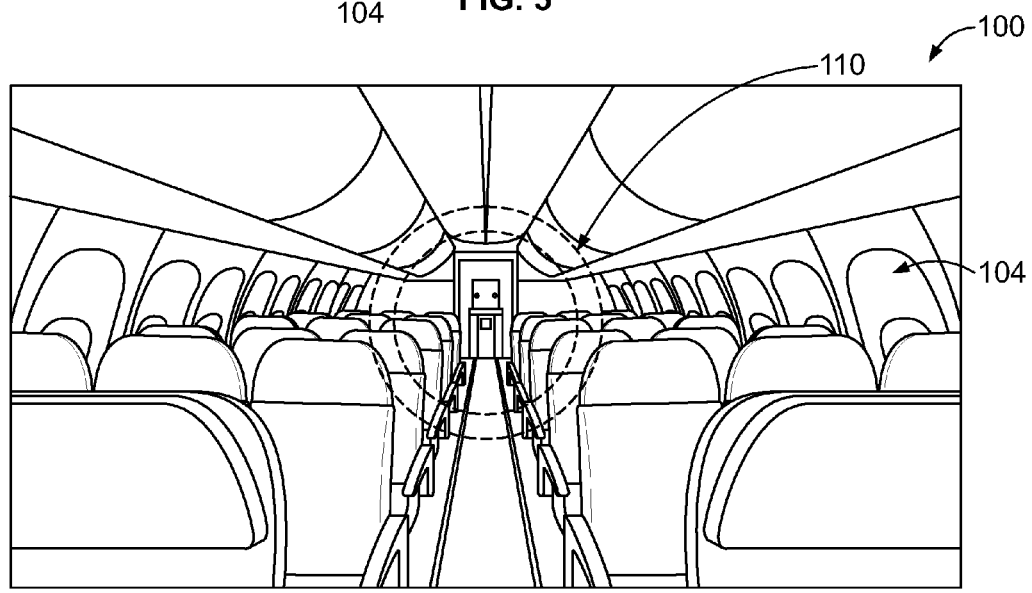

FIGS. 5 and 6 illustrate exemplary locations for the stowage carousel 110 within the aircraft 100. FIG. 5 shows the passenger cabin 104 without passenger seats showing the stowage carousel 110 near the forward section of the aircraft 100. The archway defining the walkway 136 is positioned to the interior of the stowage carousel 110 (shown in phantom in FIG. 5). FIG. 6 shows the stowage carousel 110 near an aft of the aircraft 100, such as near the aft galley of the aircraft 100. Optionally, the stowage carousel 110 (shown in phantom in FIG. 6) may be provided in line with the rear row of passenger seats. For example, the rear row of passenger seats may include two passenger seats on each side of the aisle with the stowage carousel 110 positioned between the outer seats and the fuselage 102.

Figure 7:
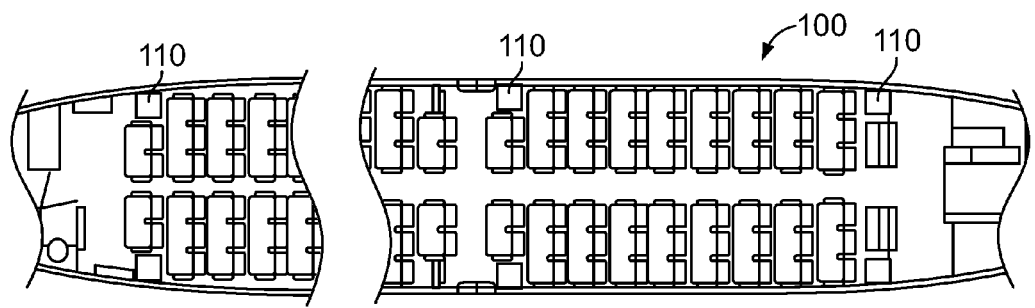
FIG. 7 illustrates the aircraft showing possible locations of the stowage carousels.

FIG. 7 illustrates the aircraft 100 showing possible locations of the stowage carousels 110. For example, FIG. 7 illustrates a forward stowage carousel 110 forward of the front row of seats, such as between the front row of seats and the entry door to the aircraft 100. A partition wall may be provided between the stowage carousel 110 and the front row of seats. The stowage carousel 110 may be accessed at the forward side of the partition wall and stowage carousel 110. For example, a door in the partition wall may provide access to the stowage carousel 110 and passengers may load carry-on luggage into the stowage carousel 110 as the passengers enter the aircraft 100 through the entry door.

A mid-stowage carousel 110 is illustrated in FIG. 7. For example, the mid-stowage carousel 110 may be aligned with the wings of the aircraft 100. The mid-stowage carousel 110 may be in line with a row of seats. The mid-stowage carousel 110 may provide additional stowage for passenger luggage or other items or cargo.

FIG. 7 illustrates an aft stowage carousel 110 at the aft portion of the aircraft 100. The aft stowage carousel 110 may be used to supplement stowage for the aft galley. For example, galley containers may be loaded into the aft stowage carousel 110. The aft stowage carousel 110 may be loaded from the rear of the aft stowage carousel 110.

Figure 8:
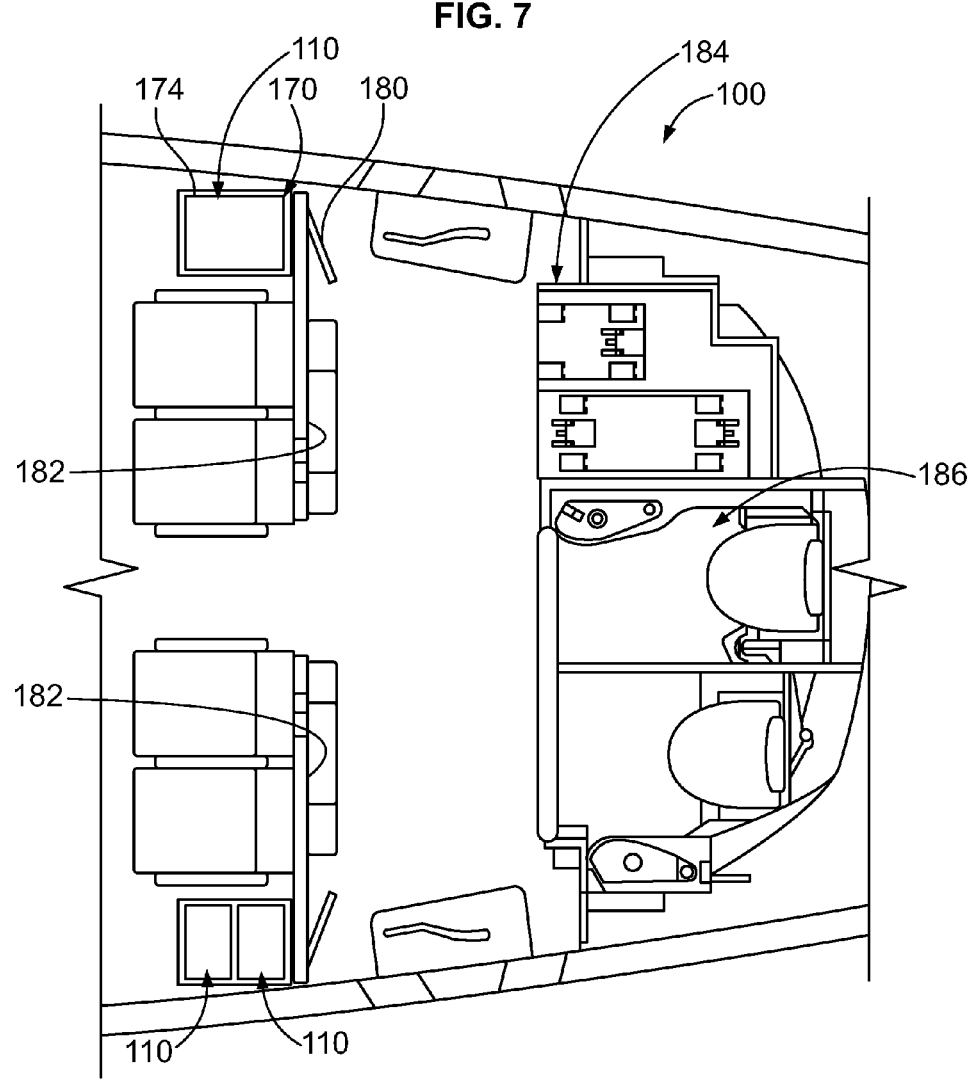
FIG. 8 is an enlarged view of an aft section of the aircraft showing the stowage carousel adjacent an aft galley in accordance with an exemplary embodiment.

FIG. 8 is an enlarged view of the aft section of the aircraft 100 showing the aft stowage carousel 110 adjacent the aft galley. The stowage carousel 110 may be provided in line with the rear row of passenger seats. The stowage compartments 170 (FIG. 4) may be accessed through doors 180 in a partition wall 182 behind the rear row of passenger seats. The doors 180 may be hingedly coupled to the partition wall 182, such as at the outer edge, the inner edge, a top edge or a bottom edge of the door 180. The doors 180 may be at a selected ergonomically appropriate height for loading and unloading, such as at waist level. Optionally, multiple doors may be provided for accessing cargo in different stowage compartments 170. Optionally, the door 180 may be large enough to access cargo in multiple stowage compartments 170. The door 180 may be opened and the galley containers 174 may be loaded into corresponding stowage compartments 170. The stowage compartments 170 may be successively loaded, such as one or two at a time, by loading the galley container 174 and then rotating the stowage carousel 110 to the next position to load the next galley container 174. The galley containers 174 may be unloaded in a similar manner, such as by reversing the process or by continuing to rotate the stowage carousel 110 through an entire 360° loop or to a predetermined position, to access the desired stowage compartment 170.

By storing a plurality of the galley containers 174 in the stowage carousel 110 the aft galley 184 may be considerably smaller than conventional aft galleys. For example, the size of the aft galley 184 may be reduced by 50% or more. Reducing the size of the aft galley 184 allows aft lavatories 186 to be positioned in the space previously occupied by the larger conventional aft galley. For example, in conventional aircraft, the aft lavatories would have been positioned in the location of the rear row of passenger seats and stowage carousel 110 illustrated in FIG. 8. By moving the aft lavatories 186 rearward into the space previously occupied by the aft galley 184, an additional row of passenger seats may be provided in the aircraft 100. As such, revenue generation per flight of the aircraft 100 may be increased by the use of the stowage carousel 110 holding a plurality of the galley containers 174.

Figure 9:
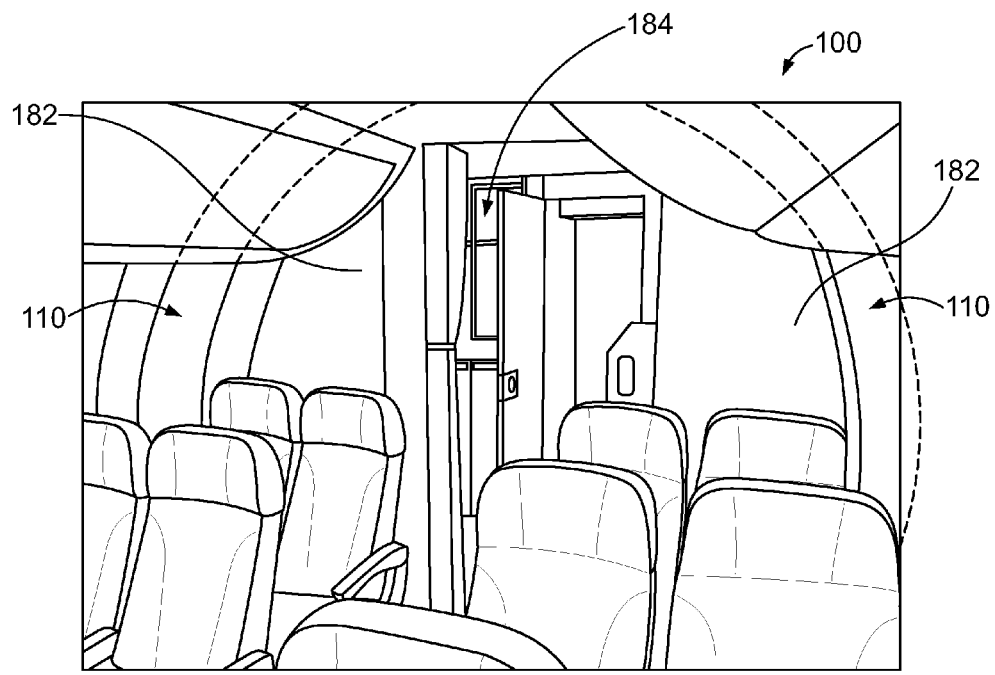
FIGS. 9 and 10 illustrate the stowage carousel in the aircraft in accordance with an exemplary embodiment.
Figure 10:
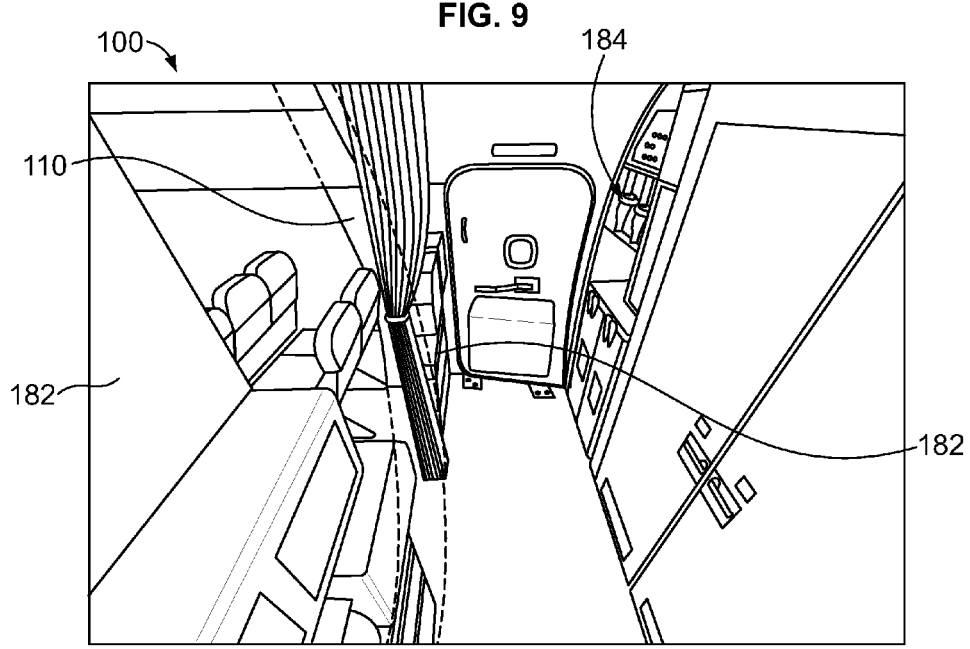

FIGS. 9 and 10 illustrate the rear aft stowage carousel 110 in the aircraft 100. The stowage carousel 110 is provided in line with the rear row of passenger seats and is accessed from behind the partition wall 182. In an exemplary embodiment, the stowage compartments 170 (FIG. 4) are rotated about the stowage carousel 110 such that at least one stowage compartment 170 is positioned along a side of (e.g., in-line with) a passenger seat, at least one stowage compartment 170 is positioned vertically above a passenger seat, and at least one stowage compartment 170 is positioned vertically below a passenger seat. The aft galley 184 holds galley carts, but does not need dedicated storage for galley containers 174 (FIG. 4) as the galley containers 174 are stowed in the stowage carousel 110.

Figure 11:
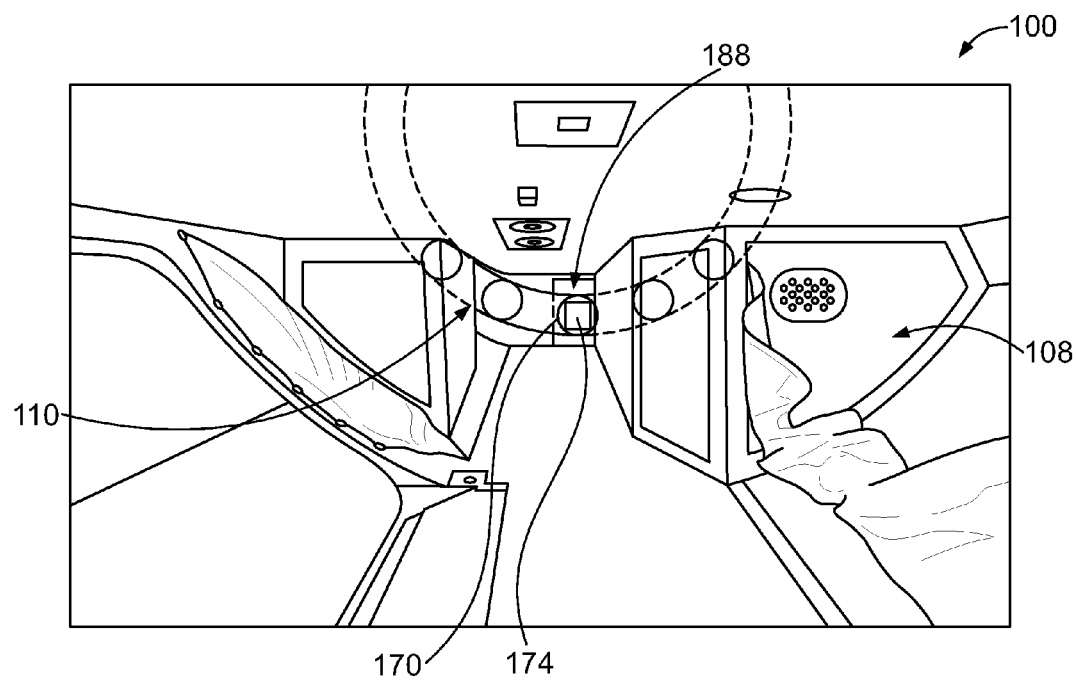
FIG. 11 illustrates a portion of the aircraft showing a lower lobe with the stowage carousel positioned therein.

FIG. 11 illustrates a portion of the aircraft 100 showing the lower lobe 108 with the stowage carousel 110 (shown in phantom) positioned in the lower lobe 108. In an exemplary embodiment, a loading bay 188 may be provided in the lower lobe 108 to access the lower lobe 108 from outside the aircraft 100. For example, the loading bay 188 may be provided at or near the aft end of the aircraft 100. The stowage carousel 110 may be accessible through the loading bay 188. As such, the cargo 174 may be loaded into the stowage compartments 170 of the stowage carousel 110 (or unloaded) through the loading bay 188 in the lower lobe 108 of the aircraft 100. For example, the catering truck supplying the standard galley containers 174 may load the galley containers 174 through the loading bay 188 at or near ground level as opposed to loading the galley containers 174 into the aft galley through the rear entry door of the aircraft 100.

Loading through the loading bay 188 at or near ground level may be easier and/or take less time than loading through the rear entry door of the aircraft 100. Such loading may negate the need for special equipment, such as a scissors-lift cargo truck. Optionally, other activities may occur in the aft galley while the galley containers are loaded into the loading bay 188 without needing access to the rear entry by the catering truck. The cargo 174 may be accessible within the passenger cabin 104 and may be loaded and/or unloaded in the passenger cabin 104 as well as the lower lobe 108.

Figure 12:
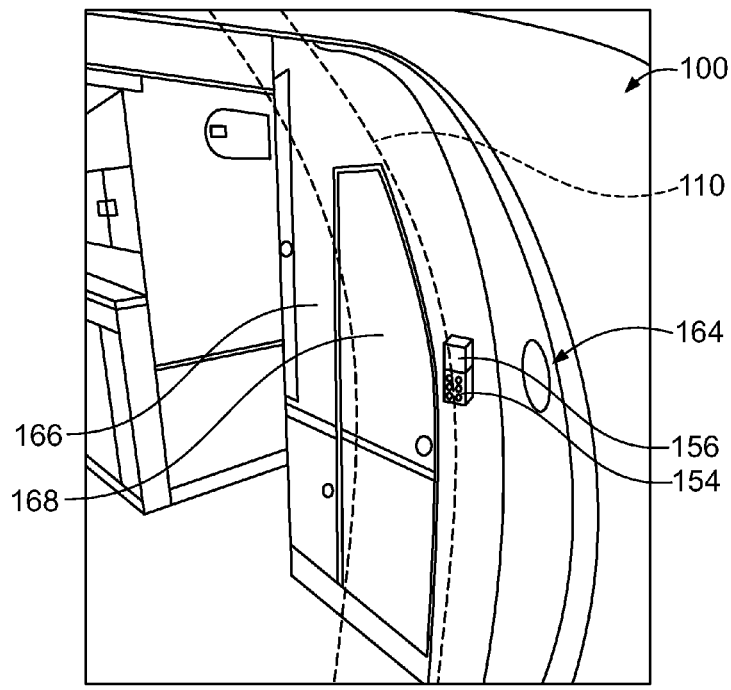
FIG. 12 illustrates a forward entry of the aircraft showing a possible location of the stowage carousel.

FIG. 12 illustrates the forward entry 164 to the aircraft 100. A partition wall 166 is provided at the entry 164. A door 168 is provided in a closable opening in the partition wall 166 to access the stowage carousel 110 (shown in phantom in FIG. 12). In an exemplary embodiment, a scanner 154 is provided at or near the door 168. The scanner 154 forms part of the control system 150 (FIG. 3).

When a passenger enters the aircraft 100 through the entry 164, the passenger may enter passenger identification, such as by scanning his or her boarding pass at the scanner 154, to access the stowage carousel 110. In other various embodiments, the scanner 154 may be a fingerprint scanner, a face recognition scanner, a voice recognition scanner or another type of scanner for passenger identification. The passenger may open the door 168 and load his or her carry-on luggage into the stowage carousel 110, such as into a certain stowage compartment 160 (FIG. 3). By entering passenger identification, the control system 150 is able to link the luggage stored in a particular stowage compartment 160 with a particular passenger. When the passenger needs to access his or her luggage, the passenger may again enter the passenger identification, such as scanning the boarding pass, and the control system 150 may rotate the stowage carousel 110 until the desired stowage compartment 160 is accessible through the door 168. Optionally, the stowage carousel 110 may be restricted from rotating unless the door 168 is in a closed position to avoid injury to passengers.

The control system 150 may be controlled in other ways in alternative embodiments. For example, the user interface 156 may be provided at the partition wall 166. The user interface 156 may include a display screen and/or buttons for controlling operation of the stowage carousel 110. For example, a user may enter passenger information into the user interface 156, such as entering a seat number or passcode, to control operation of the control system 150.

Figures 13, 14, 15:
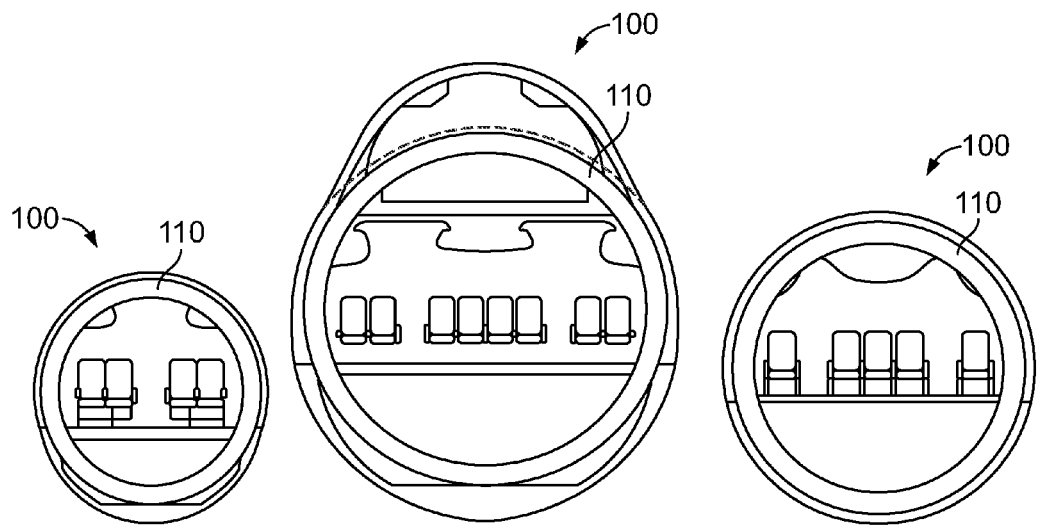
FIGS. 13-17 illustrate exemplary embodiments of stowage carousels on various types of aircraft.
Figures 16, 17:
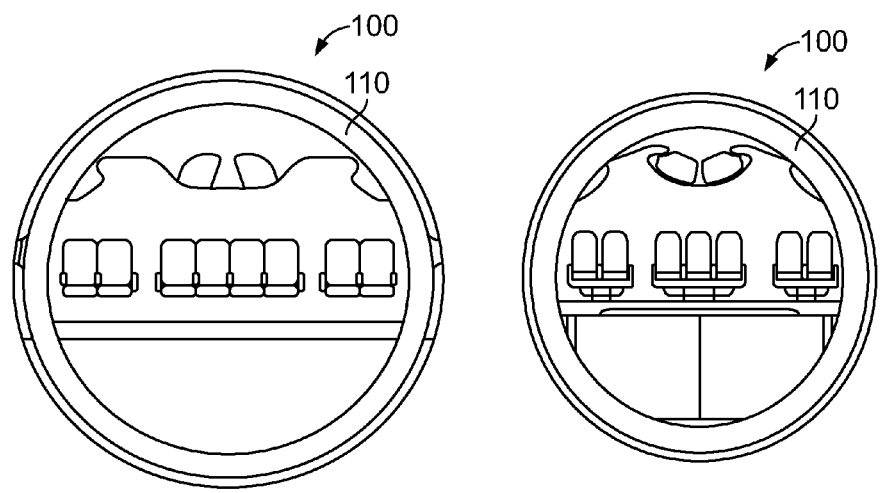

FIGS. 13-17 illustrate exemplary embodiments of stowage carousels 110 on various types of aircraft 100. FIG. 13 illustrates the stowage carousel 110 on a first aircraft configuration. FIG. 14 illustrate the stowage carousel 110 on a second aircraft configuration having a larger diameter than the first aircraft configuration. The second aircraft configuration includes an upper deck and a lower deck and the stowage carrousel 110 may be accessible in both the upper and lower decks. Alternatively, the stowage carousel 110 may be included only in portions of the fuselage 102 having the constant section (e.g., only in the portion of the fuselage 102 having the lower deck so as to not interfere with passenger seating in the upper deck). In other alternative embodiments, the upper deck may have a partial loop stowage carrousel, such as a stowage carousel that does not penetrate the upper deck floor and that travels along a partial or arched path within the upper passenger cabin area. FIG. 15 illustrates the stowage carousel 110 on a third aircraft configuration larger than the first aircraft configuration but smaller than the second aircraft configuration. FIG. 16 illustrates the stowage carousel 110 on a fourth aircraft configuration larger than the third aircraft configuration. FIG. 17 illustrates the stowage carousel 110 on a fifth aircraft configuration smaller than the fourth aircraft configuration. Because the various aircraft 100 have different diameter fuselages 102, various sized stowage carousels 110 may be provided. Larger diameter stowage carousels 110 may have greater number of stowage compartments for stowing more cargo than smaller diameter stowage carousels. The stowage carousel 110 may be used in other types of aircraft. The stowage carousel 110 may be used in vehicles or applications other than aircraft in alternative embodiments.

Figure 18:
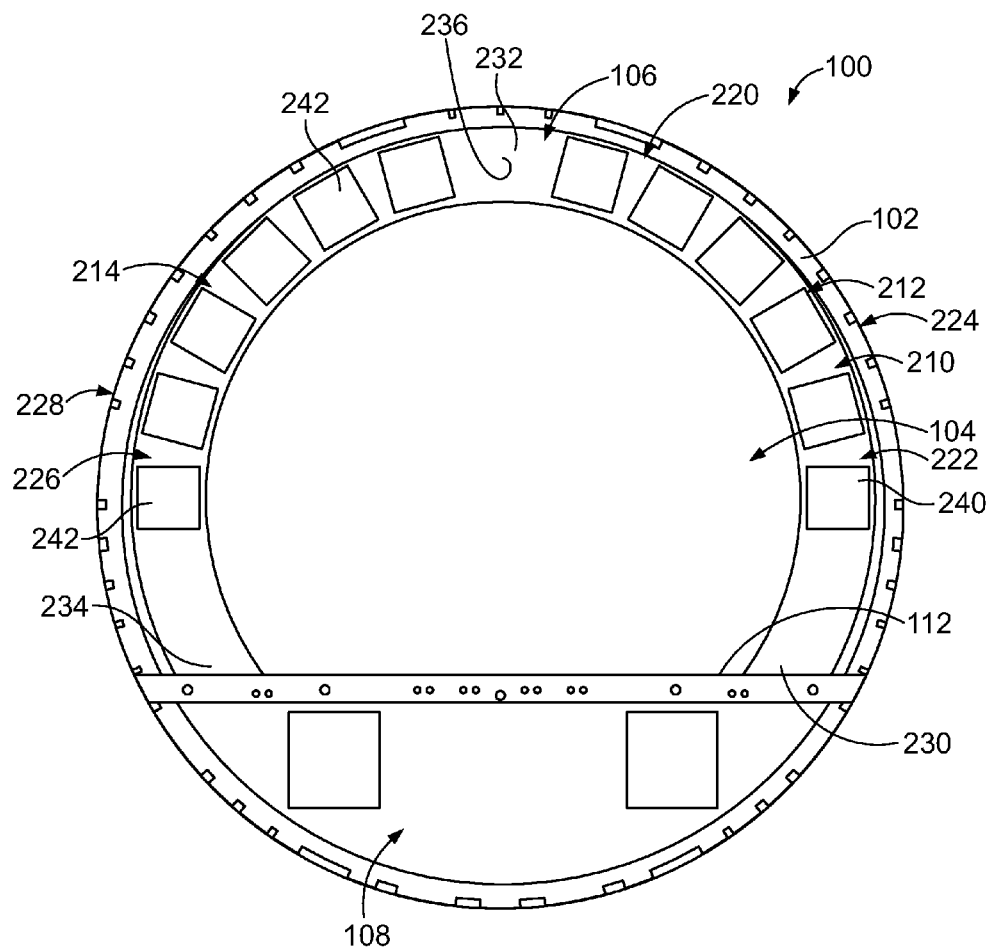
FIG. 18 illustrates a stowage carousel formed in accordance with an exemplary embodiment.

FIG. 18 illustrates a stowage carousel 210 formed in accordance with an exemplary embodiment. The stowage carousel 210 is similar to the stowage carousel 110 (shown in FIGS. 1-12), except the stowage carousel 210 does not pass through the cabin floor 112 of the aircraft 100. Rather, the stowage carousel 210 is provided above the cabin floor 112 in the passenger cabin 104 and in the upper crown 106. The stowage carousel 210 is discontinuous and does not extend entirely circumferentially around the fuselage 102. The stowage carousel 210 extends along an arc path extending only partially around the fuselage 102. The stowage carousel 210 may include similar components and may be controlled in a similar manner as the stowage carousel 110, such similar or like components and operation not being repeated herein but being applicable to the stowage carousel 210. Optionally, such as when used on a multi-deck aircraft, the stowage carousel 210 may be provided in only the upper deck area or only in the lower deck area.

The stowage carousel 210 includes one or more annular segments. For example, in the illustrated embodiment, the stowage carousel 210 includes two annular segments 212, 214, which may be operated independently. The stowage carousel 210 includes a revolving conveyor 220 having a first segment 222 associated with the first segment 212 and a second segment 226 associated with the second segment 214. The first segment 222 extends along a first sidewall 224 of the fuselage 102. The second segment 226 extends along a second sidewall 228 of the fuselage 102 opposite the first sidewall 224. The first and second segments 222, 226 may be revolved or rotated independently from each other. The first and second segments 222, 226 are both arc shaped. The first segment 222 has a bottom end 230 at or near the cabin floor 112 and a top end 232 opposite the bottom end 230. The top end 232 may be provided in the upper crown 106 of the aircraft 100. The second segment 226 includes a bottom end 234 at or near the cabin floor 112 and a top end 236 opposite the bottom end 234. The top end 236 may be provided in the upper crown 106 of the aircraft 100. In an exemplary embodiment, the top ends 232, 236 of the first and second segments 222, 226, respectively, face each other at the top of the aircraft 100. The first and second segments 222, 224 revolve not just vertically but in an arc shape (and thus partially horizontally) to allow a greater amount of storage capacity in the revolving conveyor than if the stowage carousel 210 only stowed the cargo vertically. Optionally, the arc path may be non-circular, but rather may be elliptical or oval, such as arch-shaped. For example, the path may be flatter in some areas, such as along the top. The arc shaped segments 222, 226 have a greater stowage capacity per cabin floor footprint than a vertical segment or closet. Additionally, by curving the segments 222, 226, the stowage carousel 210 may be shifted further outward toward the sidewalls 224, 228 allowing a larger walkway through the stowage carousel 210 and/or providing more stowage room inside the stowage carousel 210 (e.g., for a fixed position closet inside the inner ring of the stowage carousel 210).

The cargo may be loaded into either of the segments 222, 226 of the revolving conveyor 220 and rotated therein. For example, the cargo may be loaded into corresponding stowage compartments 240, 242 and rotated within the revolving conveyor 220. The cargo may be loaded at an ergonomically convenient height, such as waist level or knee level, and rotated upward around the revolving conveyer 220 to a stowage height that is higher than the loading height. The cargo may be loaded at floor level to increase the amount of cargo that may be stowed in the stowage carousel 210. The stowage carousel 210 may be unloaded in a reverse direction or reverse operation. For example, the lower most stowage compartment 240 may be unloaded and then the revolving conveyor 220 may be rotated in an unloading direction to unload the next stowage compartment 240 successively. Optionally, rather than pre-sized stowage compartments 240, the cargo may be attached directly to the revolving conveyor 220, such as using a hook or other attachment component and rotated upward or downward by the revolving conveyor 220.

By not passing through the cabin floor 112, the lower lobe 108 remains unaffected by the stowage carousel 210. For example, other components of the aircraft 100 in the lower lobe 108 do not need to be moved or redesigned to fit the stowage carousel 210 in the aircraft 100. The stowage carousel 210 may be retrofit into existing aircraft 100 with minimal impact to the aircraft 100. Additionally, because the stowage carousel 210 does not penetrate the cabin floor 112, joists or beams of the cabin floor 112 are unaffected by the stowage carousel 210. Optionally, the stowage carousel 210 may be designed and made deeper (e.g., fore to aft), such as to span multiple floor joists with such design. More cargo may be stored in the deeper stowage compartments, such as two galley containers per stowage compartment or with the longest dimension of the carry-on luggage extending along the depth of the stowage compartment.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A stowage carousel for handling cargo aboard an aircraft, the stowage carousel comprising:
   a revolving conveyor having an inner ring facing a passenger cabin of the aircraft and an outer ring radially outward of the inner ring and facing a fuselage of the aircraft, the inner ring extending along a first arc path, the outer ring extending along a second arc path, the inner ring and the outer ring being rotatable within the aircraft; and
   stowage compartments associated with the revolving conveyor, the stowage compartments being configured to receive the cargo, the stowage compartments being rotatable within the aircraft,
   wherein the revolving conveyor is situated within the aircraft partially in the passenger cabin and partially in at least one of the upper crown and the lower lobe of the aircraft.

2. The stowage carousel of claim 1, wherein the revolving conveyor is at least partially vertically oriented and defines a walkway interior of the inner ring.

3. The stowage carousel of claim 1, wherein the outer ring of the revolving conveyor has an outer radius approximately equal to a side wall radius dimension of the fuselage.

4. The stowage carousel of claim 1, wherein the revolving conveyor is open inside the inner ring and dimensioned for passengers to walk through the revolving conveyor.

5. The stowage carousel of claim 1, wherein the arc path of the inner ring extends entirely circumferentially around the aircraft and the arc path of the outer ring extends entirely circumferentially around the aircraft such that the revolving conveyor is continuous and configured to revolve 360° within the fuselage.

6. The stowage carousel of claim 1, wherein the revolving conveyor is discontinuous and positioned above a floor of the passenger cabin such that the revolving conveyor does not penetrate the floor of the passenger cabin.

7. The stowage carousel of claim 6, wherein the revolving conveyor includes a first segment along a first side wall of the fuselage and a second segment along a second side wall of the fuselage opposite the first side wall, the first and second segments being arc shaped, the first and second segments each having a bottom end near the floor and a top end in the upper crown, the top ends of the first and second segments facing each other.

8. The stowage carousel of claim 1, wherein the revolving conveyor passes through a floor of the passenger cabin at or near a first side wall of the fuselage and at or near a second side wall of the fuselage opposite the first side wall.

9. The stowage carousel of claim 1, further comprising a lining covering an inside of the revolving conveyor facing the passenger cabin, the lining having a closable opening providing access to the stowage compartments, wherein the stowage compartments are configured to receive the cargo through the closable opening.

10. The stowage carousel of claim 1, wherein the revolving conveyor is provided in both the upper crown and the lower lobe, the revolving conveyor being rotatable such that the stowage compartments are rotatable from the passenger cabin into the upper crown and from the passenger cabin into the lower lobe.

11. The stowage carousel of claim 1, wherein the stowage compartments are mounted to the revolving conveyor and are movable with the revolving conveyor.

12. The stowage carousel of claim 1, wherein the stowage compartments are rotatable relative to the revolving conveyor.

13. The stowage carousel of claim 1, wherein the stowage compartments include a plurality of compartment walls including a bottom wall, the stowage compartments being hingedly coupled to a mounting bracket of the revolving conveyor extending between the inner ring and the outer ring such that the bottom wall remains at a bottom of the stowage compartment as the revolving conveyor and the stowage compartment is rotated about the fuselage.

14. The stowage carousel of claim 1, wherein the stowage compartments are sized, shaped and dimensioned to receive aircraft standard size carry-on luggage.

15. The stowage carousel of claim 1, wherein the stowage compartments are sized, shaped and dimensioned to receive aircraft standard galley containers.

16. The stowage carousel of claim 1, wherein the stowage compartments are configured to be loaded and unloaded in the lower lobe of the aircraft and are configured to be loaded and unloaded in the passenger cabin of the aircraft.

17. The stowage carousel of claim 1, further comprising a control system operably coupled to the revolving conveyor, the control system having an actuator causing the revolving conveyor to rotate, the control system controlling a position of the revolving conveyor with respect to the fuselage.

18. The stowage carousel of claim 17, wherein the control system comprises a user interface for controlling operation of the revolving conveyor, the user interface being accessible within the passenger cabin.

19. The stowage carousel of claim 17, wherein the control system comprises a scanner configured to scan passenger identification of a passenger to operate the revolving conveyor to rotate to a position for the passenger to retrieve cargo.

20. The stowage carousel of claim 1, wherein the revolving conveyor is configured to be positioned in line with a row of passenger seats such that the revolving conveyor is positioned between the fuselage and at least one passenger seat.

21. The stowage carousel of claim 1, wherein the revolving conveyor is configured to be positioned in the aircraft such that at least one stowage compartment is positioned along a side of a passenger seat, at least one stowage compartment is positioned vertically above a passenger seat, and at least one stowage compartment is positioned vertically below a passenger seat.

22. The stowage carousel of claim 1, wherein the revolving conveyor includes mounting brackets extending between the inner ring and the outer ring, the stowage compartments being hingedly coupled to corresponding mounting brackets.

23. A method of stowing cargo aboard an aircraft, the method comprising:
moving the cargo into a passenger cabin of the aircraft;
placing the cargo into stowage compartments of a revolving stowage carousel via an opening, the revolving stowage carousel including a revolving conveyor supporting the stowage compartments, the revolving conveyor having an inner ring facing a passenger cabin of the aircraft and an outer ring radially outward of the inner ring and facing a fuselage of the aircraft, the inner ring extending along a first arc path, the outer ring extending along a second arc path, the inner ring and the outer ring being rotatable within the aircraft; and
rotating the inner and outer rings of the revolving conveyor to rotate the stowage compartments of the revolving stowage carousel to stow the cargo.

24. The method of claim 23, further comprising:
rotating the revolving stowage carousel to unstow the cargo;
removing the cargo from the revolving stowage carousel via the opening; and
removing the cargo from the passenger cabin of the aircraft.

25. The method of claim 23, further comprising operating a control system to control the position of the revolving stowage carousel to place different cargo into a different stowage compartment of the stowage carousel.

26. The method of claim 25, wherein said operating the control system comprises scanning a passenger boarding pass at or near the opening to control positioning of the revolving stowage carousel.

27. The method of claim 23, wherein said rotating the revolving stowage carousel comprises rotating the cargo through an arc shaped path along a side wall of a fuselage of the aircraft.

28. The method of claim 23, wherein said rotating the revolving stowage carousel comprises rotating the cargo into an upper crown of the aircraft.

29. The method of claim 23, wherein said rotating the revolving stowage carousel comprises rotating the cargo into a lower lobe of the aircraft.

30. The method of claim 23, wherein said rotating the revolving stowage carousel comprises rotating the cargo through a continuous 360° loop around the fuselage of the aircraft.

31. The method of claim 23, wherein said rotating the revolving stowage carousel comprises rotating the cargo through a cabin floor of the aircraft.

32. The method of claim 23, wherein said placing the cargo into stowage compartments of a revolving stowage carousel comprises placing the cargo into a stowage compartment being independently rotatable relative to the inner ring and the outer ring such that a bottom of the stowage compartment remains vertically below the cargo as the stowage compartment rotates with the stowage carousel.

* * * * *